UNITED STATES PATENT OFFICE.

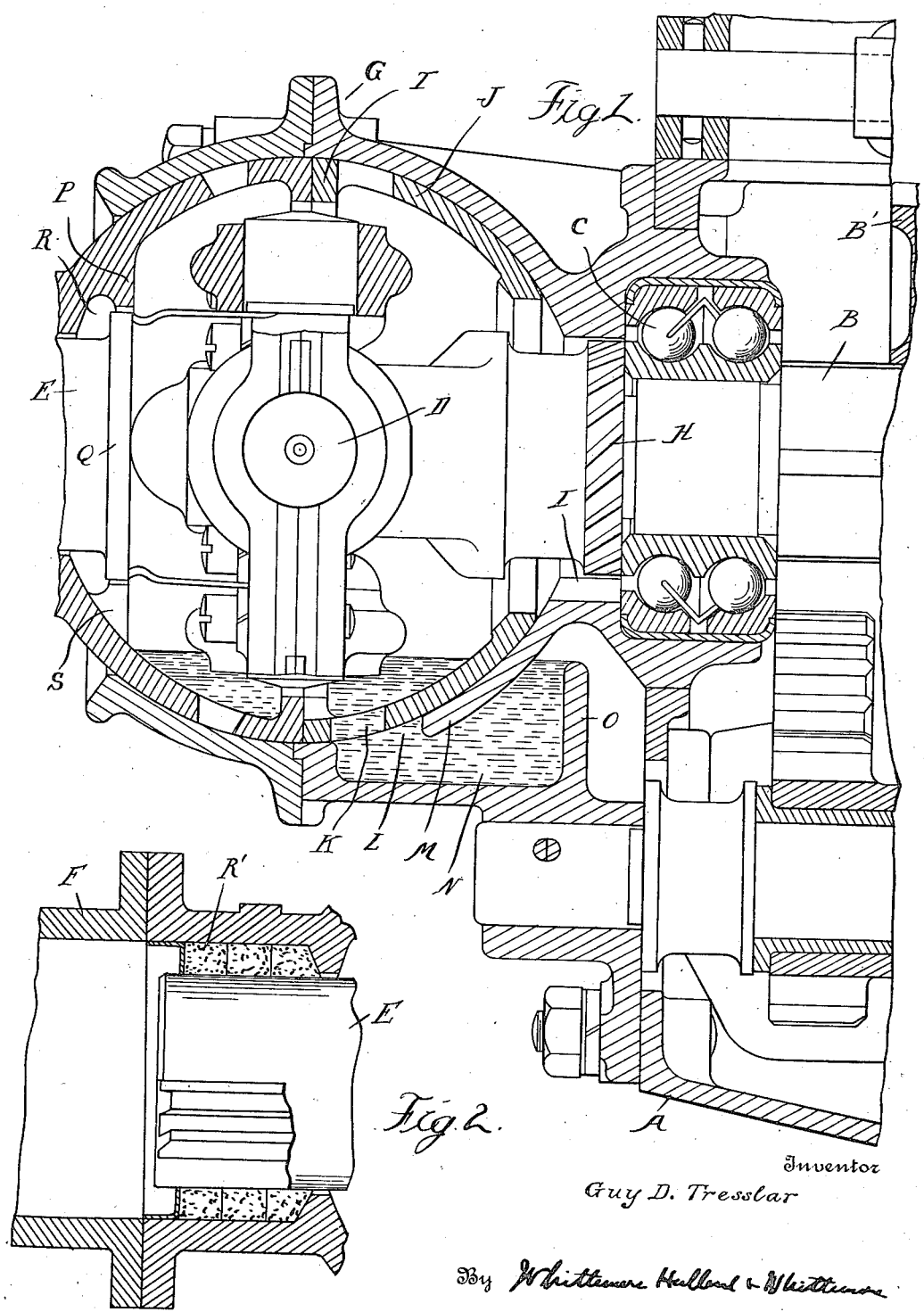

GUY D. TRESSLAR, OF FLINT, MICHIGAN, ASSIGNOR TO GENERAL MOTORS CORPORATION, OF DETROIT, MICHIGAN, A CORPORATION OF DELAWARE.

SELF-LUBRICATING UNIVERSAL JOINT FOR MOTOR-VEHICLE TRANSMISSION-SHAFTS.

1,268,897.     Specification of Letters Patent.     Patented June 11, 1918.

Application filed August 27, 1917. Serial No. 188,353.

*To all whom it may concern:*

Be it known that I, GUY D. TRESSLAR, a citizen of the United States of America, residing at Flint, in the county of Genesee and State of Michigan, have invented certain new and useful Improvements in Self-Lubricating Universal Joints for Motor-Vehicle Transmission-Shafts, of which the following is a specification, reference being had therein to the accompanying drawings.

The invention relates to transmission mechanism for motor vehicles of that type in which the transmission-shaft extending to the rear axle is provided with a universal joint adjacent to the housing for the transmission-gearing. More specifically the invention relates to a construction in which the universal joint in the rotary transmission-shaft is concentric with a hollow universal joint in the driving thrust connection. It is the object of the present invention to maintain constant lubrication of the universal joint in both the rotary drive and thrust connections, and to this end the invention comprises the construction as hereinafter set forth.

In the drawings:

Figure 1 is a longitudinal section through a portion of the transmission-gearing housing and universal joint embodying my invention;

Fig. 2 is a similar view through a complementary portion thereof.

In the present state of the art it is usual to provide separate means of lubrication for the transmission-gearing and for the universal joint in the transmission-shaft. This necessitates oil-tight packing between the housings of these parts of the mechanism, as otherwise there is danger of all of the lubricant running out from one of the housings into the other. With my improvement, instead of endeavoring to separate the lubricant in the two housings, I positively propel it from one to the other and also provide an overflow system by which the surplus lubricant may be returned. In detail, A is the transmission-gearing housing, B is the spline-shaft therein having one or more transmission-gears B' mounted thereon, C is a journal-bearing for the rear end of the spline-shaft, D is the universal joint connecting the spline-shaft with a transmission-shaft, E, which extends to the rear axle, F is the tubular housing for said shaft forming the driving thrust connection and G the hollow universal joint between said driving thrust connection and the transmission gearing housing A.

In the operation of the transmission the splash of lubricant by the rotation of the spline-shaft and gears will maintain the surfaces of the parts constantly covered. The lubricant on the shaft will pass into the journal-bearing therefor, which, as shown, is of the ball type, and in the absence of packing between the transmission-gearing housing and universal joint a certain quantity of the lubricant would leak into the latter. I desire, however, to maintain a constant flow into the universal joint housing, and therefore have formed on the periphery of the shaft obliquely-arranged channels H. These are so inclined with respect to the direction of rotation of the shaft when the vehicle is traveling forward that the lubricant will be forced rearward and will therefore pass from the bearing C into the hollow universal joint G. One or more grooves, I, parallel to the axis of the shaft are arranged in the bearing surrounding the portion having the grooves H, so that the coöperation of the incline and parallel grooves is to produce a constant flow rearward.

With the construction as thus far described there would be a tendency to overflow the hollow universal joint G, so that the lubricant therein would leak out around the transmission-shaft E and pass down into the axle. This result I have avoided by providing a return flow passage with a dam therein for maintaining a constant height or liquid level. As shown, the male member J of the hollow universal joint G has formed in the equatorial portion thereof one or more apertures K, which register with the aperture L in the lower part of the female member M, thereby opening a passage between the interior of the hollow joint G and a chamber N formed in the lower part of the member M, in which chamber is arranged a dam O. Thus the height of the lubricant within the hollow universal joint is the level of the top of the dam and any surplus lubricant will overflow the dam and thence downward into the bottom of the transmission-gearing housing A. The lubricant within the hollow non-rotating universal joint will be thrown on to the inner walls thereof by the splash of the rotating universal joint, and will drain downward from said walls. To prevent drainage into the housing F of the thrust connection an annular flange P is formed on the spherical wall, and in the same plane as a flange or collar Q on the inner joint D. In rear of this flange P is an annular groove R, the arrangement being such that any lubricant draining back the spherical walls will be directed radially inward, while any lubricant thrown centrifugally outward by the flange Q will also pass in a radial direction. Any lubricant which passes between the flanges Q and P will be centrifugally thrown outward into the groove R and will drain backward through apertures S in the flange P to the bottom of the housing. Felt or other packing R' surrounding the rotary shaft will prevent further passage of lubricant from the channel R into the housing F. To lubricate the peripheral bearings in the inner universal joint D, flanges T are equatorially arranged upon the inner wall of the hollow universal joint G, and from these flanges the lubricant will drip upon the bearings.

With the construction described, the universal joint is lubricated solely by the lubricant introduced into the transmission-gearing housing, and avoids the necessity of disassembling the joint for re-packing or the provision of any other independent means of lubrication. At the same time a positive and constant propulsion of lubricant into the transmission-gearing housing will insure proper lubrication.

What I claim as my invention is:

1. In a rotary transmission, the combination with a transmission-gearing housing, a transmission-shaft and a universal joint adjacent to said housing, through which said shaft is driven from the transmission-gearing, of means operated by the rotation of said shaft for positively feeding lubricant from said housing to said joint.

2. In a rotary transmission mechanism, the combination with a transmission-gearing housing, a transmission-shaft and a universal joint in said shaft adjacent to said housing, of splash means for passing lubricant from said housing to said shaft, and means for propelling the lubricant longitudinally of said shaft to the universal joint.

3. In a rotary transmission mechanism, the combination with a transmission-gearing housing, a transmission-shaft therein, a universal joint in said transmission-shaft adjacent to said housing and a hollow concentrically-arranged universal joint constituting a driving thrust connection and housing for the first-mentioned universal joint, of means for propelling lubricant from said transmission-gearing housing into said hollow universal joint, means in the latter for directing lubricant to the universal joint in the rotary transmission-shaft, and means permitting the drainage of the surplus lubricant from said hollow universal joint back into said transmission joint housing.

4. In a rotary transmission, the combination with a revoluble shaft, a universal joint therein and a nonrotating hollow universal joint surrounding and forming a housing for said first-mentioned universal joint, of splash means on the rotating universal joint for maintaining lubricant on the walls of the non-rotating joint, and means for draining the lubricant from said walls to the periphery of the rotating joint.

5. The combination with a rotary transmission-shaft, a universal joint therein and a hollow-nonrotating universal joint concentric with and surrounding said rotating universal joint, of means for maintaining a constant supply of lubricant within said hollow universal joint, whereby the splash of the rotating universal joint will throw lubricant on the walls of the non-rotating joint, means for directing the drainage from said walls to parts to be lubricated on the rotating joint, and means for preventing drainage from said walls from flowing outward upon the transmission-shaft.

6. The combination with a rotary transmission shaft, a rotating universal joint therein and a non-rotating hollow universal joint surrounding and forming a housing for said rotating universal joint, of means for maintaining a constant level of lubricant within said non-rotating universal joint which will be splashed by the rotation of said inner universal joint, and means for preventing the drainage of lubricant along said transmission-shaft out from said hollow universal joint.

7. The combination with a rotary transmission-shaft, a universal joint therein, a non-rotating hollow universal joint surrounding and forming a housing for said rotating universal joint and a housing adjacent to said universal joints containing lubricant, of splash means for feeding lubricant from the last-named housing on to said rotary transmission-shaft, means on said rotary transmission-shaft for propelling the lubricant longitudinally thereof into said hollow non-rotating universal joint, a drainage connection for the lubricant in said hollow universal joint permitting the overflow thereof back into said housing, and a dam in said drainage connection for maintaining a predetermined level of liquid in said hollow universal joint.

8. In a rotary transmission mechanism, the combination with a transmission-gearing housing, a transmission-shaft therein, a universal joint in said transmission-shaft adjacent to said housing, and a hollow concentrically-arranged universal joint constituting a driving thrust connection and housing for the first-mentioned universal joint, of means for passing lubricant from said transmission-gearing housing into said hollow universal joint, and an equatorial interior projection upon a member of the hollow universal joint for directing lubricant to the bearings of the rotative universal joint.

9. The combination with a rotary transmission-shaft, a universal joint therein, a non-rotating hollow universal joint surrounding and forming a housing for said rotating universal joint, a housing adjacent to said universal joints containing lubricant, means for introducing lubricant from the last-named housing into said hollow universal joint, a drainage connection for the lubricant in said hollow universal joint permitting the overflow thereof back into said housing, and a dam in said drainage connection for maintaining a predetermined level of liquid in said hollow universal joint.

In testimony whereof I affix my signature.

GUY D. TRESSLAR.